United States Patent
Ngoc

(10) Patent No.: US 6,784,249 B2
(45) Date of Patent: Aug. 31, 2004

(54) RUBBERY POLYMER

(76) Inventor: Hung Dang Ngoc, 64, allee du Cedre, 94450, Limeil Brevannes (FR)

(*) Notice: Subject to any disclaimer, the term of this patent is extended or adjusted under 35 U.S.C. 154(b) by 0 days.

(21) Appl. No.: 09/835,914

(22) Filed: Apr. 16, 2001

(65) Prior Publication Data

US 2001/0053824 A1 Dec. 20, 2001

Related U.S. Application Data

(60) Provisional application No. 60/200,321, filed on Apr. 28, 2000.

(51) Int. Cl.⁷ .......................... C08L 23/00; C08L 23/04
(52) U.S. Cl. .................. 525/191; 525/222; 525/223; 525/236; 525/240; 525/241; 526/290; 526/318; 526/318.4; 526/318.41; 526/318.43; 526/319; 526/326; 428/500
(58) Field of Search ................ 526/290, 318, 526/318.4, 318.41, 318.43, 319, 326; 525/191, 222, 223, 236, 240, 241; 428/500

(56) References Cited

U.S. PATENT DOCUMENTS 5,415,940 A    5/1995   Ngoc et al. ............. 428/424.4
6,388,015 B1 * 5/2002   Aimura et al. ............ 525/194

\* cited by examiner

*Primary Examiner*—Nathan M. Nutter
(74) *Attorney, Agent, or Firm*—Birch, Stewart, Kolasch & Birch, LLP

(57) ABSTRACT

There is a need for polymers that offer a high level of heat and ultraviolet light resistance. It is particularly critical for polymers that are utilized in making skin compounds for automotive instrument and door panels to display excellent heat and ultraviolet light resistance. Polymer blends having such characteristics can be made by blending certain rubbery polymers with halogen containing polymers, such as polyvinyl chloride (PVC). There is currently a demand for halogen-free polymers having such characteristics. This invention discloses a rubbery polymer that can be blended with polyolefins, such as polyethylene or polypropylene, to make leathery compositions having good heat and ultraviolet light resistance. The rubbery polymer of this invention is comprised of repeat units which are comprised of (a) butyl acrylate, (b) an alkoxyalkylene acrylate, (c) styrene, (d) a half ester maleate soap, and (e) a crosslinking agent.

11 Claims, No Drawings

RUBBERY POLYMER

This application claims the benefit of United States Provisional Application Serial No. 60/200,321, filed on Apr. 28, 2000.

BACKGROUND OF THE INVENTION

Automotive instrument panels and door panels are typically composites which are made of a rigid backing which supports a semi-rigid urethane foam with the semi rigid urethane foam being covered with a skin compound. Such skin compounds are typically blends of polyvinyl chloride (PVC) with a nitrile rubber (NBR). The nitrile rubber is included in such blends as a permanent modifier for the PVC that provides it with a higher degree of flexibility.

The automotive industry is continuing to move toward more aerodynamic body designs that typically include larger glass areas. Such design changes have significantly increased the heat and ultraviolet light aging requirements of automotive interiors. This has in turn significantly increased the demands put upon the polymers that are utilized as skins in automotive interior panels.

Heat and light stabilizers can be employed to improve the heat and ultraviolet light aging characteristics of conventional PVC/NBR blends that are utilized as skins for automotive interior panels. However, the degree to which the aging characteristics of such blends can be improved by the addition of additives is limited. In fact, there is a demand for performance characteristics in such applications that heretofore has not been realized by the utilization of heat and light stabilizers. For instance, it would be highly desirable for the skins used in automotive panels to resist discoloration and cracking under conditions of high heat and intense ultraviolet light throughout the life of the vehicle.

NBR/PVC blends offer an array of physical properties that make them useful as a skin composition for automotive panels. The NBR acts as a permanent flexibilizing monomer for the PVC. It also acts as a shrinkage control agent, and embossing aid, and improves grain retention. The NBR in such blends further provides vacuum forming gauge control and exhibits low fog characteristics. NBR is highly compatible with PVC and has the capability of being recycled. It is essential for any polymer that is substituted for NBR to display these essential characteristics.

U.S. Pat. No. 5,415,940 discloses a rubbery polymer that can be blended with PVC to make leathery compositions that are particularly useful in automotive applications by virtue of their high level of heat and ultra-violet light resistance. The rubbery polymers disclosed by U.S. Pat. No. 5,415,940 is comprised of repeat units which are comprised of (a) butyl acrylate, (b) at least one member selected from the group consisting of methyl methacrylate, ethyl methacrylate, methyl acrylate, and ethyl acrylate, (c) acrylonitrile, (d) styrene, (e) a half ester maleate soap, and (f) a crosslinking agent.

SUMMARY OF THE INVENTION

There is a growing demand being made by the automotive and other industries for halogen-free materials. The present invention relates to a rubbery polymer that can be blended with polyolefins, such as polyethylene or polypropylene, to make leathery compositions that exhibit a high level of resistance to heat and ultra-violet light. These compositions are particularly useful in manufacturing skins for automotive interior paneling. Skin compositions that are made utilizing this rubbery polymer provide a higher level of resistance to heat and ultraviolet light than those made utilizing conventional NBR/PVC blends. The rubbery polymer compositions of this invention also offer low fog characteristics, low odor, shrinkage control, and grain retention. They also act as an embossing aid and as a permanent flexibilizing modifier. The rubbery polymers of this invention also have characteristics that make them useful in building gasket applications.

This invention more specifically discloses a rubbery polymer that can be blended with polyolefins to make leathery compositions having good heat and ultraviolet light resistance, said rubbery polymer being comprised of repeat units which are derived from (a) butyl acrylate, (b) an alkoxyalkylene acrylate, (c) styrene, (d) a half ester maleate soap, and (e) a crosslinking agent.

The present invention also discloses a leathery composition which is useful in automotive applications which is comprised of (1) a polyolefin, (2) a plasticizer, and (3) a rubbery polymer which is comprised of repeat units which are derived from (a) butyl acrylate, (b) an alkoxyalkylene acrylate, (c) styrene, (d) a half ester maleate soap, and (e) a crosslinking agent.

The subject invention further reveals a panel for automotive applications which is comprised of a semirigid urethane foam which is supported by a rigid backing, wherein said semirigid urethane foam is covered with a leathery skin which is comprised of (1) polyolefin, (2) a plasticizer, and (3) a rubbery polymer which is comprised of repeat units which are derived from (a) butyl acrylate, (b) an alkoxyalkylene acrylate, (c) styrene, (d) a half ester maleate soap, and (e) a crosslinking agent.

DETAILED DESCRIPTION OF THE INVENTION

The rubbery polymers of this invention are synthesized utilizing a free radical emulsion polymerization technique. These rubbery polymers are comprised of repeat units which are derived from (a) butyl acrylate, (b) an alkoxyalkylene acrylate, (c) styrene, (d) a half ester maleate soap, and (e) a crosslinking agent. The crosslinking agent is typically a multi-functional acrylate, a multi-functional methacrylate or divinylbenzene. Some specific examples of crosslinking agents that can be used include ethylene glycol methacrylate, divinylbenzene, and 1,4-butanediol dimethacrylate.

Technically, the rubbery polymers of this invention contain repeat units (chain linkages) that are derived from (a) butyl acrylate, (b) an alkoxyalkylene acrylate, (c) styrene, (d) a half ester maleate soap, and (e) a crosslinking agent. These repeat units differ from the monomers that they were derived from in that they contain one less carbon-carbon double bond than is present in the respective monomer. In other words, a carbon-to-carbon double bond is consumed during the polymerization of the monomer into a repeat unit in the rubbery polymer. Thus, in saying that the rubbery polymer contains various monomers in actuality means that it contains repeat units that are derived from those monomers.

The rubbery polymers of this invention will normally contain (a) about 30 to about 65 weight percent butylacrylate, (b) from about 30 to about 65 weight percent of the alkoxyalkylene acrylate, (c) from about 3 to about 25 weight percent styrene, (d) from about 1 weight percent to about 5 weight percent of a half ester maleate soap, and (e) from about 0.25 to about 8 weight percent crosslinking agent. Such rubbery polymers will preferably contain (a) from about 40 weight percent to about 54 weight percent butyl acrylate, or optionally a mixture of butyl acrylate and 2-ethylhexyl acrylate containing up to about 40% 2-ethylhexyl acrylate, (b) from about 40 to about 54 weight percent of the alkoxyalkylene acrylate, (c) from about 5 weight percent to about 18 weight percent styrene, (e) from about 1 weight percent to about 5 weight percent of a half ester maleate soap, and (f) from about 0.5 weight percent to about 4 weight percent of a crosslinking agent. The rubbery polymers of this invention will more preferably be comprised of repeat units which are derived from (a) from about 42 weight percent to about 47 weight percent butyl acrylate, or optionally a mixture of butyl acrylate and 2-ethylhexyl acrylate containing up to about 40% 2-ethylhexyl acrylate, (b) from about 42 to about 47 weight percent of the alkoxyalkylene acrylate, (c) from about 8 weight percent to about 14 weight percent styrene, (d) from about 2 weight percent to about 4 weight percent of a half ester maleate soap, and (e) from about 1 weight percent to about 3 weight percent of a crosslinking agent. The percentages reported in this paragraph are based upon the total weight of the rubbery polymer.

The rubbery polymers of the present invention are synthesized in an aqueous reaction mixture by utilizing a free radical polymerization technique. The reaction mixture utilized in this polymerization technique is comprised of water, the appropriate monomers, a suitable free radical initiator, a crosslinking agent, a half ester maleate soap, and a metal salt of an alkyl sulfonate or a metal salt of an alkyl sulfate. The reaction mixture utilized in this polymerization technique will normally contain from about 10 weight percent to about 80 weight percent monomers, based upon the total weight of the reaction mixture. The reaction mixture will preferably contain from about 20 weight percent to about 70 weight percent monomers and will more preferably contain from about 40 weight percent to about 50 weight percent monomers.

The reaction mixtures utilized in carrying out such polymerizations will typically contain from about 0.005 phm (parts per hundred parts of monomer by weight) to about 1 phm of at least one member selected from the group consisting of metal salts of alkyl sulfates and metal salts of alkyl sulfonates. It is generally preferred for the reaction mixture to contain from about 0.008 phm to about 0.5 phm of the metal salt of the alkyl sulfonate or the metal salt of the alkyl sulfate. It is normally more preferred for the reaction mixture to contain from about 0.05 phm to about 0.3 phm of the metal salt of the alkyl sulfonate or the metal salt of the alkyl sulfate.

The free radical polymerization technique utilized in this synthesis is normally initiated by including a free radical initiator in the reaction mixture. Virtually, any type of compound capable of generating free radicals can be utilized as the free radical initiator. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane, and the like, the various alkyl perketals, such as 2,2-bis-(t-butylperoxy)butane, and the like. Water soluble peroxygen free radical initiators are especially useful in such aqueous polymerizations.

The emulsion polymerizations of this invention are typically carried out at the temperature ranging between about 60° F. (20° C.) and 190° F. (88° C.). At temperatures above about 88° C. alkyl acrylate monomers, such as butyl acrylate, have a tendency to boil. Thus, a pressurized jacket would be required for heating such alkyl acrylate monomers to temperatures in excess of about 88° C. On the other hand, at polymerization temperatures of less than about 55 ° C. a redox initiator system is required to insure satisfactory polymerization rates.

The sulfonate surfactants that are useful in this invention are commercially available from a wide variety of sources. For instance, Du Pont sells sodium alkylarylsulfonate under the tradename Alkanol™, Browning Chemical Corporation sells sodium dodecylbenzene sulfonates under the tradename Ufaryl™ D1-85, and Ruetgers-Nease Chemical Company sells sodium cumene sulfonate under the tradename Naxonate Hydrotrope™. Some representative examples of sulfonate surfactants which can be used include sodium toluene-xylene sulfonate, sodium toluene sulfonate, sodium cumene sulfonates, sodium decyldiphenylether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate, and potassium toluene sulfonate.

Metal salts of alkylbenzene sulfonates are a highly preferred class of sulfonate surfactant. The metal will generally be sodium or potassium with sodium being preferred. Sodium salts of alkylbenzene sulfonates have the structural formula:

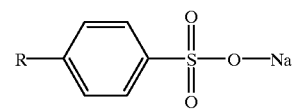

wherein R represents an alkyl group containing from 1 to about 20 carbon atoms. It is preferred for the alkyl group to contain from about 8 to about 14 carbon atoms.

The free radical emulsion polymerization utilized in synthesizing the rubbery polymers of this invention are typically conducted at a temperature which is within the range of about 10° C. to about 95° C. In most cases, the polymerization temperature utilized will vary between about 20° C. and about 80° C. The polymerization is carried out as a two step batch process. In the first step, a seed polymer containing latex is synthesized. This is done by polymerizing (a) butyl acrylate, or optionally a mixture of butyl acrylate and 2-ethylhexyl acrylate containing up to about 40% 2-ethylhexyl acrylate, (b) an alkoxyalkylene acrylate, such as methoxyethyl acrylate, and (d) a crosslinking agent.

The seed polymer containing latex is typically prepared by the polymerization of a monomer mixture which contains about 30 to about 65 weight percent butyl acrylate, or optionally a mixture of butyl acrylate and 2-ethylhexyl acrylate containing up to about 40% 2-ethylhexyl acrylate, from about 30 to about 65 weight percent of the alkoxyalkylene acrylate monomer, and from about 0.25 weight percent to 6 weight percent of the crosslinking agent. It is typically preferred for the monomeric component utilized in the first step to include about 35 to about 60 weight percent butyl acrylate, or optionally a mixture of butyl acrylate and 2-ethylhexyl acrylate containing up to about 40% 2-ethylhexyl acrylate, from about 35 to about 60 weight percent of the alkoxyalkylene acrylate monomer, and from about 0.25 weight percent to 6 weight percent of the crosslinking agent. It is generally more preferred for the monomer charge composition used in synthesizing the seed polymer latex to contain from about 40 to about 55 weight percent butyl acrylate, or optionally a mixture of butyl acrylate and 2-ethylhexyl acrylate containing up to about 40% 2-ethylhexyl acrylate, from about 40 to about 55 weight percent of the alkoxyalkylene acrylate monomer, and from about 0.5 weight percent to 5 weight percent of the crosslinking agent.

After the seed polymer latex has been prepared, styrene monomer, additional alkoxyalkylene acrylate monomer, optionally, acrylonitrile monomer, and additional crosslinking agent is added to the seed polymer containing latex. As a general rule, from about 4 parts by weight to about 30 parts by weight of styrene, from about 1 part by weight to about 20 parts by weight of acrylonitrile, and from about 0.01 to 2 parts by weight of the crosslinking agent will be added. In this second stage of the polymerization, it is preferred to add from about 6 parts by weight to about 22 parts by weight of styrene, from about 3 parts by weight to about 12 parts by weight of acrylonitrile, and from about 0.05 parts by weight to 1 part by weight of the crosslinking agent. It is typically more preferred for from about 10 parts by weight to about 17 parts by weight of styrene, from about 4 parts by weight to about 8 parts by weight of acrylonitrile, and from about 0.1 parts by weight to about 0.5 parts by weight of the crosslinking agent to be added to the seed polymer latex to initiate the second phase of the polymerization.

A wide variety of crosslinking agents can be utilized in carrying out the polymerizations of this invention. Some representative examples of crosslinking agents which can be utilized include difunctional acrylates, difunctional methacrylates, trifunctional acrylates, trifunctional methacrylates, and divinylbenzene. 1,4-butanediol dimethacrylate has proven to be particularly useful as the crosslinking agent.

In most cases, the polymerization will be continued until a high monomer conversion has been attained. At this point, the rubbery polymer made by the two step batch polymerization process is recovered from the emulsion (latex). This can be accomplished by utilizing standard coagulation techniques. For instance, coagulation can be accomplished by the addition of salts, acids, or both to the latex.

The half ester maleate soap utilized in the polymerization is prepared by reacting maleic anhydride with a fatty alcohol containing from about 10 to about 24 carbon atoms.

It is typically preferred to utilize a fatty alcohol which contains from about 12 to about 16 carbon atoms. One mole of the maleic anhydride is reacted with one mole of the fatty alcohol in producing the half ester maleate soap. This reaction is typically conducted at a temperature that is within the range of about 50° C. to about 80° C. Sodium hydroxide or potassium hydroxide is then typically added to make the half ester maleate soap After the rubbery polymer is recovered by coagulation, it is dried. It is sometimes advantageous to convert the rubbery polymer into a powder to facilitate its usage. In this case, it will be beneficial to add a partitioning agent to the rubbery polymer. Some representative examples of partitioning agents that can be employed include calcium carbonate, emulsion polyvinyl chloride, and silica. Calcium carbonate is a highly desirable partitioning agent that can be utilized in such applications.

The rubbery polymers of this invention can be blended with polyolefins, to make leather like compositions. Some representative examples of polyolefins that can be used include linear low density polyethylene, high density polyethylene, polypropylene, polybutylene, and modified polyolefins, such as ethylene vinyl acetate (EVA). The leathery compositions of this invention offer an excellent combination of properties for utilization in making skin compounds for panels used in automotive applications. These leathery compositions can be prepared by blending the rubbery polymer into the polyolefin utilizing standard mixing techniques. It is highly preferred for the rubbery polymer to be in powdered form when blended into the polyolefin to make such leathery composition.

A wide variety of plasticizers that are compatible with the polyolefin resin can be employed. Some representative examples of plasticizers which are highly suitable for this application include abietic derivatives, such as hydroabietyl alcohol, methyl abietate and hydrogenated methyl abietate; acetic acid derivatives, such as cumylphenyl acetate; adipic acid derivatives, such as benzyloctyl adipate, dibutyl adipate, diisobutyl adipate, di-(2-ethylhexyl) adipate, diisononyl adipate, diisooctyl adipate, dinonyl adipate, C7–9 linear adipate, dicapryl adipate, octyl decyl adipate (n-octyl, n-decyl adipate), straight chain alcohol adipate, didecyl adipate (diisodecyl adipate), dibutoxyethyl adipate, high molecular weight adipate, polypropylene adipate, modified polypropylene adipate; azelaic acid derivatives, such as dicyclohexyl azelate, di-(2-ethylhexyl) azelate, di-n-hexyl azelate, low temperature plasticizer, diisooctyl azelate; benzoic acid derivatives such as diethylene glycol dibenzoate, dipropylene glycol dibenzoate, diethylene glycol benzoate and dipropylene glycol benzoate blend, proprietary low stain, neopentyl glycol dibenzoate, glyceryl tribenzoate, timethylolethane tribenzoate, pentaerylthritol tribenzoate, cumylphenyl benzoate; polyphenyl derivatives such as hydrogenated terphenyl; citric acid derivatives, such as triethyl citrate, tri-n-butyl citrate, acetyl triethyl citrate, acetyl tri-n-butyl citrate, acetal tributyl citrate; epoxy derivatives such as butyl epoxy stearate, epoxy-type plasticizer, epoxy-type plasticizer tallate, alkyl epoxy stearate, epoxidized butyl ester, epoxidized octyl tallage, epoxidized soybean oil, epoxidized triglyceride, epoxidized soya bean oil, epoxidized sunflower oil, epoxidized-type plasticizer, epoxidized linseed oil, epoxidized tallate ester, 2-ethylhexylepoxy tallate, octyl epoxy stearate; proprietary esters such as proprietary ester and mixed ester; ether derivatives, such as cumylphenyl benzyl ether; formal derivatives such as butyl carbitol formal; fumaric acid derivatives, such as dibutyl fumarate, diisooctyl fumarate, dioctyl fumarate; glutaric acid derivatives such as mixed dialkyl glutarates and dicumylphenyl glutarate; glycol derivatives such as diethylene glycol dipelargonate, triethylene glycol dipelargonate, triethylene glycol di-(2-ethylbutyrate), triethylene glycol di-caprylate-caprate, triethylene glycol di-(2-ethylhexoate), triethylene glycol dicaprylate, tetraethylene glycol dicaprylate, polyethylene glycol di-(2-ethylhexoate), butyl phthalyl butyl glycolate, triglycolester of vegetable oil fatty acid, triethylene glycol ester of fatty acid; linear dibasic acid derivatives such as mixed dibasic ester; petroleum derivatives such as aromatic hydrocarbons; isobutyric acid derivatives such as 2,2,4-trimethyl-1,3-pentanediol diisobutyrate; isophthalic acid derivatives such as di(2-ethylhexyl) isophthalate, diisooctyl isophthalate, dioctylisophthalate; lauric acid derivatives such as butyllaurate, 1,2-propylene glycol monolaurate, ethylene glycol monoethyl ether laurate, ethylene glycol monobutyl ether laurate, glycerol monolaurate, polyethylene glycol-400-dilaurate; mellitates such as n-octyl, n-decyl trimellitate, tri-n-octyl-n-decyl trimellitate, triisononyl trimellitate, triisooctyl trimellitate, tricapryl trimellitate, diisooctyl monoisodecyl trimellitate, triisodecyl trimellitate, tri(C7–9 alkyl) trimellitate, tri-2-ethylhexyl trimellitate; nitrile derivatives such as fatty acid nitrile; oleic acid derivatives such as butyl oleate, 1,2-propylene glycol mono oleate, ethylene glycol monobutyl ether oleate, tetrahydrofurfuryl oleate, glyceryl monoleate; paraffin derivatives such as chlorinated paraffins, diethylene glycol dipelargonate, triethylene glycol dipelargonate, 2-butoxyethyl dipelargonate; phenoxy plasticizers such as acetyl paracumyl phenol; phosphoric acid derivatives such as tri-(2-ethylhexyl) phosphate, tributoxyethyl phosphate, triphenyl phosphate, cresyl diphenyl phosphate, tricresyl phosphate, tri-isopropylphenyl phosphate, alkyl aryl phosphates, diphenyl-xylenyl phosphate, phenyl isopropylphenyl phosphate; phthalic acid derivatives such as alkyl benzene phthalates, dimethyl phthalate, dibutyl phthalate, diisobutyl phthalate, dihexyl phthalate, butyl octyl phthalate, butyl isodecyl phthalate, butyl iso-hexyl phthalate, diisononyl phthalate, dioctyl phthalate, di-(2-ethyl hexyl) phthalate, n-octyl-n-decyl phthalate, hexyl octyl decyl phthalate, didecyl phthalate diisodecyl phthalate, diisodecyl phthalate, diundecyl phthalate, butyl-ethylhexyl phthalate, butylbenzyl phthalate, octylbenzyl phthalate, dicyclohexyl phthalate, diphenyl phthalate, alkylaryl phthalates and 2-ethylhexylisodecyl phthalate; ricinoleic acid derivatives such as methylacetyl ricinoleate, n-butyl acetyl ricinoleate, glyceryl triacetyl ricinoleate; sebacic acid derivatives such as dimethyl sebacate, dibutyl sebacate, and dibutoxyethyl sebacate; stearic acid derivatives such as glyceryl tri-acetoxy stearate, butyl acetoxy stearate, methylpentachlorostearate, and methoxylethyl acetoxy stearate; sucrose derivatives such as sucrose benzoate; sulfonic acid derivatives such as alkyl-sulfonic esters of phenol; tall oil derivatives such as methylester of tall oil and isooctyl ester of tall oil; and terephthalic acid derivatives such as dioctyl terephthalate.

Such leathery compositions typically contain from about 40 to 160 parts by weight of the rubbery polymer, from about 10 to about 50 parts of a plasticizer, and from about 0.1 to about 5 parts by weight of an antidegradant per 100 parts by weight of the polyolefin. It is typically preferred for such leathery compositions to contain from about 60 to about 120 parts by weight of the rubbery polymer, from about 15 to about 40 parts of the plasticizer, and from about 0.5 to 3 parts of an antidegradant (per 100 parts of the PVC). It is typically more preferred for the leathery composition to contain from about 70 to about 90 parts by weight of the rubbery polymer, from about 20 to about 30 parts by weight of the plasticizer, and from about 1 to 2 parts by weight of the antidegradant per 100 parts by weight of the polyolefin.

Such compositions will also generally contain an acrylonitrile-butadiene-styrene resin (ABS resin). The leathery composition will typically contain from about 15 parts to about 80 parts of ABS resin per 100 parts of polyolefin. The leathery composition will preferably contain from about 25 to about 55 parts per weight of the ABS resin per 100 parts by weight of the polyolefin. It is generally more preferred for the leathery composition to contain from about 30 to about 40 parts by weight of the ABS resin per 100 parts by weight of polyolefin. Various colorants and/or pigments will typically also be added to the composition to attain a desired color.

The leathery compositions of this invention are useful in a wide variety of applications. For example, they have been found to be extremely valuable when used in making skins for automotive panels. Such panels are typically comprised of a semi-rigid urethane foam which is supported by a rigid backing and covered with the leathery composition of this invention. Such skins are made by calendering the leathery compositions of this invention and then cutting them to the desired size and shape. Such skins for automotive applications which are made with the leathery compositions of this invention offer outstanding heat and ultraviolet light stability. These are highly desirable characteristics that can help to prevent the skin of automotive panels from cracking during the normal life of the vehicle.

This invention is illustrated by the following examples that are merely for the purpose of illustration and are not to be regarded as limiting the scope of this invention or the manner in which it can be practiced. Unless specifically indicated otherwise, all parts and percentages are given by weight.

EXAMPLE 1

In this experiment a rubbery polymer was made utilizing the techniques of this invention. The polymerization was conducted in a reactor having a capacity of 100 liters. The reactor was equipped with an axially flow turbine agitator which was operated at 110 rpm (revolutions per minute).

The reactor was charged with 74.6 kg (kilograms) of water, 0.92 kg of a half ester maleate soap (made with $C_{16}$ fatty alcohol), 0.31 kg of a 50 percent aqueous potassium hydroxide solution, 0.062 kg of sodium dodecylbenzene sulfonate, 21.85 kg of n-butylacrylate, 3.85 kg of methoxyethylacrylate, 0.38 kg of 1,4-butane diol dimethacrylate, 0.078 kg of t-dodecylmercaptan, and 0.058 kg of potassium persulfate. A temperature of about 60° C. was maintained throughout the polymerization. When a total solids content of about 25 percent was achieved, 0.025 kg of additional potassium persulfate was added. This first stage of the polymerization was carried out for a period of about 2½ hours. This first stage polymerization resulted in the production of a seed polymer latex which was used in the second step of the polymerization.

In the second step of the polymerization, 1.47 kg of acrylonitrile, 3.4 kg of styrene, 0.050 kg of divinylbenzene, and 0.009 kg of t-dodecylmercaptan were charged into the reactor containing the seed polymer latex. The polymerization proceeded until a solids content of about 30 percent was attained. The latex made was coagulated and a dry rubber was recovered. The rubbery polymer produced was not sticky and could be ground into a powder. It also had a glass transition temperature of about −30° C. and exhibited low odor characteristics.

EXAMPLE 2

A leathery composition can be made by blending the rubbery polymer synthesized in Example 1 into polyethylene resin. Such a blend can be prepared by blending 35 parts of ABS resin, 80 parts of the rubbery polymer, 25 parts of a plasticizer, 1.5 parts of antidegradants, and 4.5 parts of a red color dispersion stabilizer into 100 parts of the polyethylene resin.

An oil heated Farrel 8 inch (20.3 cm) plastics mill operated at 176° C. (349° F.) can be used in the compound preparation. All powders, liquids, and stabilizers can first blended in a Hobart mixer to form a rough dry blend. The dry blend and elastomer can then be banded on the mill and mixed for about 15 minutes before sheeting out at 0.040 +/−5 gauge. The leathery composition made will have physical characteristics which made it highly suitable for utilization in making skin compounds for panels used in automotive applications.

COMPARATIVE EXAMPLE 3

In this experiment a rubbery polymer was made utilizing utilizing a procedure similar to the procedure employed in Example 1. The polymerization was conducted in a reactor having a capacity of 100 liters. The reactor was equipped with an axially flow turbine agitator which was operated at 110 rpm (revolutions per minute).

The reactor was charged with 74.6 kg (kilograms) of water, 0.92 kg of a half ester maleate soap (made with C16 fatty alcohol), 0.31 kg of a 50 percent aqueous potassium hydroxide solution, 0.062 kg of sodium dodecylbenzene sulfonate, 25.7 kg of n-butylacrylate, 0.38 kg of 1,4-butane diol dimethacrylate, 0.078 kg of t-dodecylmercaptan, and 0.058 kg of potassium persulfate. A temperature of about 60° C. was maintained throughout the polymerization. When a total solids content of about 25 percent was achieved, 0.025 kg of additional potassium persulfate was added. This first stage of the polymerization was carried out for a period of about 2½ hours. This first stage polymerization resulted in the production of a seed polymer latex which was used in the second step of the polymerization.

In the second step of the polymerization, 1.47 kg of acrylonitrile, 3.4 kg of styrene, 0.050 kg of divinylbenzene, and 0.009 kg of t-dodecylmercaptan were charged into the reactor containing the seed polymer latex. The polymerization proceeded until a solids content of about 30 percent was attained. The latex made was coagulated and a dry rubber was recovered. The rubbery polymer produced had a glass transition temperature of about −40° C. and was very sticky. The polymer made in this experiment was too sticky to be ground into a powder. This experiment shows the critical nature of including an alkoxyalkylene acrylate in the rubbery polymer.

EXAMPLE 4

The procedure used in Example 1 was repeated in this experiment except that 5 phm of dicyclopentadiene methacrylate (DCPOEMA) was included in the monomer charge composition. The DCPOEMA introduced double bonds into the rubbery polymer to facilitate vulcanization during reactive processing.

While certain representative embodiments and details have been shown for the purpose of illustrating the subject invention, it will be apparent to those skilled in this art that various changes and modifications can be made therein without departing from the scope of the subject invention.

What is claimed is:

1. A rubbery polymer having good heat and ultraviolet light resistance, said rubbery polymer being comprised of repeat units which are derived from (a) butyl acrylate, (b) an alkoxyalkylene acrylate, (c) styrene, (d) a half ester maleate soap, and (e) a crosslinking agent.

2. A rubbery polymer as specified in claim 1 wherein said rubbery polymer is void of repeat units that are derived from any member selected from the group consisting of methyl methacrylate, ethyl methacrylate, methyl acrylate, and ethyl acrylate, and wherein said rubbery polymer is void of repeat units that are derived from acrylonitrile.

3. A process for preparing a rubbery polymer having good heat and ultraviolet light resistance, said process comprising the steps of (1) polymerizing (a) butyl acrylate, (b) an alkoxyalkylene acrylate, and (c) a crosslinking agent under emulsion polymerization conditions to produce a seed polymer containing latex; (2) adding (a) styrene, and (b) additional crosslinking agent to the seed polymer containing latex under emulsion polymerization conditions which result in the formation of an emulsion containing the rubbery polymer; and (3) recovering the rubbery polymer from the emulsion containing the rubbery polymer.

4. A leathery composition which is useful in automotive applications which is comprised of (1) a polyolefin, (2) a plasticizer, and (3) a rubbery polymer which is comprised of repeat units which are derived from (a) butyl acrylate, (b) an alkoxyalkylene acrylate, (c) styrene, (d) a half ester maleate soap, and (e) a crosslinking agent.

5. A panel for automotive applications which is comprised of a semirigid urethane foam which is supported by a rigid backing, wherein said semirigid urethane foam is covered with a leathery skin which is comprised of (1) a polyolefin, (2) a plasticizer, and (3) a rubbery polymer which is comprised of repeat units which are derived from (a) butyl acrylate, (b) an alkoxyalkylene acrylate, (c) styrene, (d) a half ester maleate soap, and (e) a crosslinking agent.

6. A rubbery polymer as specified in claim 1 wherein said alkoxyalkylene acrylate is methoxyethylene acrylate.

7. A rubbery polymer as specified in claim 1 wherein the rubbery polymer is comprised of repeat units which are derived from about 30 to about 65 weight percent butylacrylate, from about 30 to about 65 weight percent alkoxyalkylene acrylate, from about 3 to about 25 weight percent styrene, from about 1 to about 5 weight percent of the half ester maleate soap, and from about 0.25 to about 8 weight percent crosslinking agent.

8. A rubbery polymer as specified in claim 1 wherein the crosslinking agent is selected from the group consisting of difunctional acrylates, trifunctional acrylates, difunctional methacrylates, trifunctional methacrylates, and divinylbenzene.

9. A rubbery polymer as specified in claim 1 wherein the rubbery polymer is comprised of repeat units which are derived from about 40 to about 54 weight percent butylacrylate, from about 40 to about 54 weight percent alkoxyalkylene acrylate, from about 5 to about 18 weight percent styrene, from about 1 to about 5 weight percent of the half ester maleate soap, and from about 0.5 to about 4 weight percent crosslinking agent.

10. A rubbery polymer as specified in claim 1 wherein the rubbery polymer is comprised of repeat units which are derived from about 42 to about 47 weight percent butylacrylate, from about 42 to about 47 weight percent alkoxyalkylene acrylate, from about 8 to about 14 weight percent styrene, from about 2 to about 4 weight percent of the half ester maleate soap, and from about 1 to about 3 weight percent crosslinking agent.

11. A leathery composition which is useful in automotive applications wherein said composition contains from about 40 to about 160 parts by weight of a rubbery polymer which is comprised of repeat units which are derived from (a) butyl acrylate, (b) an alkoxyalkylene acrylate, (c) styrene, (d) a half ester maleate soap, and (e) a crosslinking agent, from about 10 to about 50 parts by weight of a plasticizer, and from about 0.1 to about 5 parts by weight of antidegradants.

* * * * *

UNITED STATES PATENT AND TRADEMARK OFFICE
CERTIFICATE OF CORRECTION

PATENT NO. : 6,784,249 B2
DATED : August 31, 2004
INVENTOR(S) : Hung Dang Ngoc

It is certified that error appears in the above-identified patent and that said Letters Patent is hereby corrected as shown below:

<u>Title page,</u>
Insert Item:
-- [73] Assignee: ELIOKEM, 14 avenue des Tropiques, ZA de Courtaboeuf 2, Villejust, Courtaboeuf Cedex, France 91955 --

Signed and Sealed this

Seventh Day of June, 2005

JON W. DUDAS
*Director of the United States Patent and Trademark Office*